Patented Mar. 27, 1951

UNITED STATES PATENT OFFICE 2,546,658

7-CHLORO-4-[5-(N-ETHYL-N-2-HYDROXY-ETHYLAMINO)-2-PENTYL]AMINOQUINO-LINE, ITS ACID ADDITION SALTS, AND METHOD OF PREPARATION

Alexander R. Surrey, Albany, N. Y., assignor to Sterling Drug Inc., New York, N. Y., a corporation of Delaware No Drawing. Application July 23, 1949,
Serial No. 106,503

4 Claims.  (Cl. 260—286)

This invention relates to 7-chloro-4-[5-(N-ethyl-N-2-hydroxyethylamino)-2-pentyl]aminoquinoline having the formula

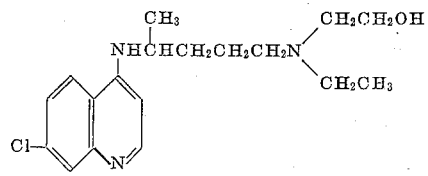

and to its preparation. The compound is useful as an antimalarial agent, and for this purpose can be used either in the free base form, or in the form of its acid-addition salts.

I have prepared this new quinoline compound by the series of steps illustrated by the following equations:

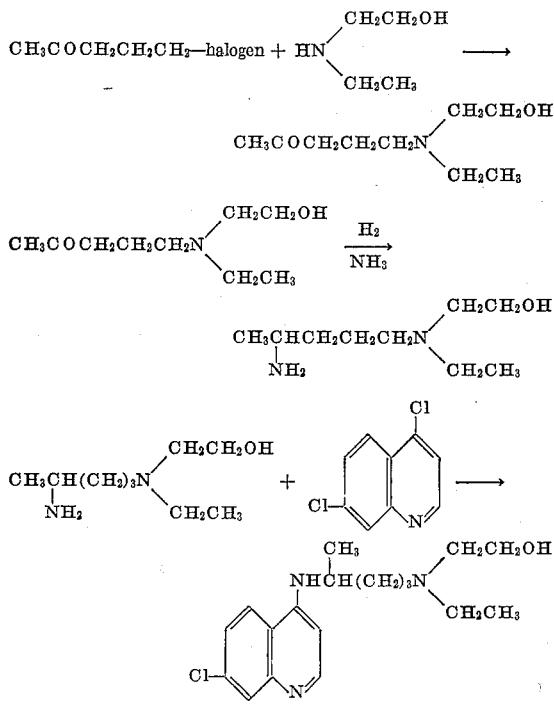

In the above illustrated synthesis, a 1-halo-4-pentanone, preferably the 1-chloro ketone, is treated with N-ethyl-N-2-hydroxyethylamine to yield 1-(N-ethyl-N-2-hydroxyethylamino)-4-pentanone, which, when reductively aminated, yields the basic side chain, 5-(N-ethyl-N-2-hydroxyethylamino)-2-pentylamine. Then, in the last step, the condensation of this basic side chain with 4,7-dichloroquinoline yields the desired product, 7-chloro-4-[5-(N-ethyl-N-2-hydroxyethylamino)-2-pentyl]aminoquinoline.

It was convenient to isolate and use the basic quinoline of my invention as the water-soluble phosphoric acid-addition salt. It is, of course, understood that other water-soluble salts, such as those derived from other nontoxic inorganic acids, including hydochloric acid, hydrobromic acid, sulphuric acid, sulfamic acid and the like, and nontoxic organic acids, including tartaric acid, citric acid, succinic acid, acetic acid, benzoic acid, oleic acid, and the like, will serve the same purpose and are within the scope of my invention.

My invention is further illustrated as follows:

*1-(N-ethyl-N-2-hydroxyethylamino)-4-pentanone*

A mixture of 323 g. of 1-chloro-4-pentanone 480 g. of N-ethyl-N-2-hydroxyethylamine and 400 g. of sodium chloride (to aid in subsequent filtration) in 1.3 liters of xylene was heated with stirring on a steam bath for two hours and then refluxed for three hours. After standing overnight, the mixture was filtered and the filter cake washed with xylene. The filtrate was fractionally distilled, yielding 207.3 g. of a fraction distilling at 89–90° C. at 0.35 mm.; $n_D^{25}$, 1.4600. This fraction, 1-(N-ethyl-N-2-hydroxyethylamino)-4-pentanone, was used in the next step of the synthesis. A sample of said fraction was further purified by distillation through a column and gave an analytically pure sample of 1-(N-ethyl-N-2-hydroxyethylamino)-4-pentanone, boiling at 85–87° C. at 0.4 mm., $n_D^{25}$, 1.4583.

*5-(N-ethyl-N-2-hydroxyethylamino)-2-pentylamine*

The 1-(N-ethyl-N-2-hydroxyethylamino)-4-pentanone from above (284.2 g.) was dissolved in 300 g. of 28% ammoniacal methanol and reduced catalytically with Raney nickel (at an initial pressure of 1000 pounds) at room temperature. After 24 hours the catalyst was filtered off and the product distilled in vacuo through a column, yielding 254 g. of a fraction distilling at 88.5–96° C. at 0.3 mm. and comprising mainly 5-(N-ethyl-N-2-hydroxyethylamino)-2-pentylamine. An analytical sample of this fraction distilled at 93° C. at 0.6 mm.; $n_D^{25}$, 1.4703.

*7-chloro-4-[5-(N-ethyl-N-2-hydroxyethylamino)-2-pentyl]aminoquinoline diphosphate*

A mixture of 90 g. of 4,7-dichloroquinoline, 90 g. of phenol, 1 g. of potassium iodide and 132 g. of 5-(N-ethyl-N-2-hydroxyethylamino)-2-pentylamine from above was heated with stirring for 18 hours at 125–130° C. Methanol (1.9 liters) was added and the mixture was filtered with charcoal. The filtrate was treated with 270 cc. of a solution of 100 g. of phosphoric acid in 300 cc. of methanol, the walls of the flask containing the filtrate were scratched with a glass rod and the mixture was allowed to stand for two days. The solid was filtered off, washed with methanol and dried, yielding 101 g. of crude 7-chloro-4-[5-(N-ethyl-N-2-hydroxyethylamino)-2-pentyl]aminoquinoline diphosphate, M. P. 155–156° C. Additional quinoline diphosphate was obtained as a gummy mass from the filtrate by concentrating the latter to about half its volume and adding acetone. The crude gummy diphosphate was dissolved in water, basified with ammonium hydroxide and the resulting liberated basic quinoline extracted with chloroform. After removal of the chloroform by distillation, the residue was dissolved in ether and crystallization was induced by scratching the walls of the flask with the glass rod. About 30 g. of the crude quinoline base, melting at 77–82° C., separated. Recrystallization of this material from ethylene dichloride or ethyl acetate yielded the purified 7-chloro-4-[5-(N-ethyl-N-2-hydroxyethylamino)-2-pentyl]aminoquinoline, M. P. 89–91° C.

The above crude quinoline diphosphate (101 g.) was purified by dissolving it in 200 cc. of water, adding 200 cc. of ethanol, and filtering the solution with charcoal. To the hot filtrate was added an additional 400 cc. of ethanol and crystallization was induced as above by scratching the walls of the flask with a glass rod. The separated product was dried at 100° C. for three hours, yielding 85 g. of 7-chloro-4-[5-(N-ethyl-N-2-hydroxyethylamino)-2-pentyl]aminoquinoline diphosphate, M. P. 162–164° C. An additional 10 g. of the basic quinoline was recovered from the filtrate by using the procedure already described hereinabove.

Instead of using 4,7-dichloroquinoline in the above condensation 4-bromo-7-chloroquinoline or 4-iodo-7-chloroquinoline can be used, but their use offers no advantage and these starting materials are somewhat more difficult to obtain.

I claim:

1. A compound selected from the group consisting of 7-chloro-4-[5-(N-ethyl-N-2-hydroxyethylamino)-2-pentyl]aminoquinoline; and acid-addition salts thereof.

2. 7-chloro-4-[5-(N-ethyl-N-2-hydroxyethylamino)-2-pentyl]aminoquinoline.

3. 7-chloro-4-[5-(N-ethyl-N-2-hydroxyethylamino)-2-pentyl]aminoquinoline diphosphate.

4. The process for preparing 7-chloro-4-[5-(N-ethyl-N-2-hydroxyethylamino)-2-pentyl]aminoquinoline which comprises reacting 5-(N-ethyl-N-2-hydroxyethylamino)-2-pentylamine with 4,7-dichloroquinoline.

ALEXANDER R. SURREY.

REFERENCES CITED

The following references are of record in the file of this patent:

UNITED STATES PATENTS

| Number | Name | Date |
| --- | --- | --- |
| 2,233,970 | Andersag et al. | Mar. 4, 1941 |

OTHER REFERENCES

Wiselogle: Survey of Antimalarial Drugs, 1941–1945 (J. W. Edwards; Ann Arbor, Michigan; 1946) vol. 2, part 2, pp. 1134–1248 and 1330–1357.